United States Patent [19]
Nakamura

[11] Patent Number: 5,943,240
[45] Date of Patent: Aug. 24, 1999

[54] MACHINE TOOL CONTROL SYSTEM AND METHOD UTILIZING METAL MOLD ARRANGEMENT INFORMATION

[76] Inventor: Kaoru Nakamura, 2-18-13 Takamori, Isehara-shi Kanagawa, 259-11, Japan

[21] Appl. No.: 08/728,181

[22] Filed: Oct. 9, 1996

[51] Int. Cl.⁶ .............................. G06F 19/00; G06G 7/64; G06G 7/66
[52] U.S. Cl. ................. 364/475.02; 364/475.01; 364/468.06; 364/472.01; 364/472.02; 483/8; 483/9
[58] Field of Search .................. 364/475.02, 475.01, 364/418.06, 468.04, 472.01, 472.02, 474.21, 474.22, 475.06, 188, 189, 191–193, 479.14, 474.26, 474.27; 483/1, 4, 5, 7, 8, 9, 11

[56] References Cited

U.S. PATENT DOCUMENTS

| | | | |
|---|---|---|---|
| 3,815,452 | 6/1974 | Wilhelmy | 82/2 R |
| 4,288,849 | 9/1981 | Yoshida et al. | 364/102 |
| 4,370,705 | 1/1983 | Imazeki et al. | 364/184 |
| 4,472,783 | 9/1984 | Jhonstone et al. | 364/132 |
| 4,550,375 | 10/1985 | Sato et al. | 364/474 |
| 4,596,066 | 6/1986 | Inoue | 26/568 |
| 4,724,524 | 2/1988 | Thomas et al. | 364/474 |
| 4,782,438 | 11/1988 | Mizukado et al. | 364/191 |
| 5,222,026 | 6/1993 | Nakamoto | 364/476 |
| 5,327,350 | 7/1994 | Endo | 364/474.21 |
| 5,378,218 | 1/1995 | Daimaru et al. | 483/9 |
| 5,391,968 | 2/1995 | Niwa | 318/569 |
| 5,488,564 | 1/1996 | Ikeda | 364/474.16 |

*Primary Examiner*—William Grant
*Assistant Examiner*—Ramesh Patel
*Attorney, Agent, or Firm*—Greenblum & Bernstein P.L.C.

[57] ABSTRACT

A machine tool control system and method are provided that utilize metal mold arrangement information to improve machining efficiency and control. According to the disclosure, a machining schedule, a machining program and metal mold information (indicating the characteristic properties of a metal mold to carry out machining) are transferred to a controller for controlling a CNC device and a machine tool unit (e.g., a turret punch press). The controller transfers the metal mold information for the machining program to the CNC device by a different transfer route than that of the machining program. The CNC device searches for a metal mold specified by the metal mold information based on metal mold arrangement information stored in a file. The metal mold arrangement information indicates each metal mold that is located in the machine tool unit. If a specified metal mold is not present, a metal mold exchange instruction is issued so that the specified metal mold may be set in the machine tool unit to carry necessary machining operations.

12 Claims, 8 Drawing Sheets

| No. | MACHINING PROGRAM | METAL MOLD INFORMATION | |
|---|---|---|---|
| | | METAL MOLD SPECIFICATIONS | PREPARATION OF USED METAL MOLD SETUP |
| 10 | P₁ | φ 30, CLEARANCE 0.1 | |
| 20 | P₂ | φ 20, CLEARANCE 0.2 | MANUAL EXCHANGE REQUIRED |
| 30 | P₃ | | |
| 40 | P₄ | | |

MACHINE TOOL CONTROL SYSTEM AND METHOD UTILIZING METAL MOLD ARRANGEMENT INFORMATION

BACKGROUND OF THE INVENTION

1. Field of the Invention

The present invention relates to a machine tool control system and, more specifically, to a machine tool control system in which a metal tool or mold predetermined by an automatic programming unit is retrieved from a tool storage of a machine tool in advance, with reference to the characteristic properties of the metal mold, and set in a turret of a machine tool.

2. Prior Art

In recent years, in the field of machining for controlling various types of machine tools which is directed toward multi-type small-quantity production, FMS (Flexible Manufacturing System) has been coming into wide use.

Generally speaking, with FMS a plurality of device controllers are connected to a single main controller which creates a schedule program for the schedule operation of various types of devices. A description is given of a machine tool control system as an example of such an FMS.

Figure 1:
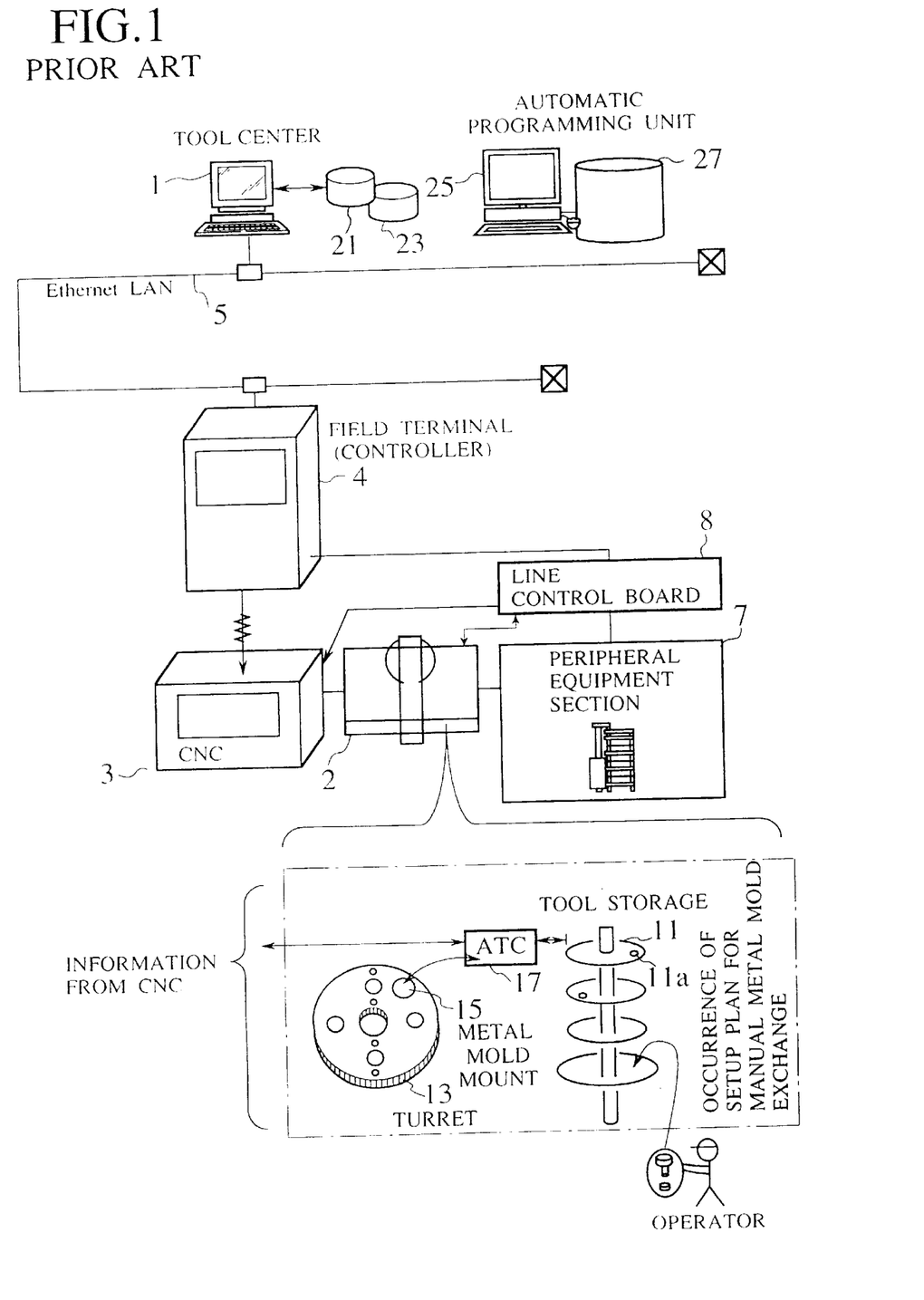
FIG. 1 is a schematic structural diagram of a machine tool control system of the prior art.

FIG. 1 is a schematic diagram of a machine tool control system of the prior art. In the machine tool control system of FIG. 1, a tool center 1 and a field terminal 4 (to be referred to as "controller" hereinafter) for transferring a machining program to a CNC device 3 for controlling a turret punch press 2 as a machine tool are connected to an Ethernet LAN 5.

To the turret punch press 2 is connected a peripheral equipment section 7 including material warehouse equipment, product warehouse equipment and the like. Each device of this peripheral equipment section 7 operates in accordance with the sequence of a line control board 8. A group of the peripheral equipment section 7, the turret punch press 2 and the CNC device 3 is referred to as an "FMS line" in the following description.

The turret punch press 2, as shown in FIG. 1, comprises a tool storage 11 for storing a plurality of metal molds and an automatic metal mold exchange unit 17 (to be abbreviated as "ATC" hereinafter) for taking out a metal mold specified by the CNC device 3 from the tool storage 11 and setting it in the metal mold mount station 15 of a turret 13.

The tool center 1 is provided with a plurality of schedule files 21 for storing machining schedules each of which consist of data including the date, type of machining, materials, quantities, spots to be machined and the like, and machining program files 23 for storing a plurality of machining programs for carrying out control in accordance with type of machining.

An automatic programming unit 25 is arranged in the vicinity of the tool center 1. This automatic programming unit 25 determines the address (to be referred to as "metal mold address" hereinafter) of each box 11a of the tool storage 11 and gives numbers to these metal mold addresses to assign the numbers to metal molds.

How to assign metal molds in the tool storage 11 to the metal mold mount stations 15 of the turret 13 timely based in a machining schedule is determined from data on the past use conditions, and this information is stored in a metal mold information file 27 as used metal mold setup information.

A description is subsequently given of the operation of the machine tool control system of the prior art constituted above.

The controller 4 communicates with the tool center 1 to read the machining schedule Hi of the day from the schedule files 21 and a machining program Mi for carrying out this machining schedule Hi properly from the machining program files 23 and reads metal mold setup information Ki for the machining program Hi from the metal mold information file 27 of the automatic programming unit 25.

The controller 4 draws a first schedule hi from the machining schedule Hi as well as a machining program mi for the schedule hi and used metal mold setup information ki specified by the machining program mi. Thereafter, this machining program mi and the used metal mold setup information ki are transferred to the CNC device 3 by memory transfer or by a DNC transfer system.

The CNC device 3 transmits the metal mold setup information ki to the ATC 17 of the turret punch press 2.

The ATC 17 turns the turret 13 based on the used metal mold setup information ki. The ATC 17 also takes out a metal mold at a metal mold address specified by the used metal mold setup information ki from the box of the tool storage 11 and sets it in the metal mold mount station of the turret 13.

When a metal mold in the tool storage is exchanged by an operator, the controller 4 detects the occurrence of a setup plan for manual metal mold exchange through the line control board 8.

Due to the occurrence of a setup plan for manual metal mold exchange, the controller 4 exchanges the used metal mold setup information ki to be read from the automatic programming unit 25.

However, a metal mold in a box of the tool storage may be changed to another metal mold by a field operator.

Therefore, when a metal mold in a box of the tool storage at a metal mold address specified by the used metal mold setup information obtained by the ATC from the automatic programming unit is set in a metal mold mount station of the turret, there is the possibility that a target metal mold may not be set.

When a metal mold in the tool storage is exchanged by an operator, the controller 4 needs to exchange used metal mold setup information read from the automatic programming unit by temporarily stopping the line.

That is, when line operation is carried out based on predetermined used metal mold setup information, there is such a problem that, if the metal mold of tool storage is different, operation is suspended frequently.

Further, there is another problem that the transfer time of the controller 4 is long because it transfers a machining program and used metal mold setup information together by DNC transfer system.

For instance, it takes approximately 3 to 4 seconds longer to transfer 1 KB metal mold setup information only at a transfer speed of 9,600 bps.

Further, the controller 4 transfers a machining program and used metal mold setup information together to the CNC device.

Therefore, since the CNC device must separate the machining program and the metal mold setup information to analyze the metal mold setup information when it transfers the metal mold setup information to the ATC, it takes long to start machining.

SUMMARY OF THE INVENTION

The present invention has been made to solve the above problems and it is therefore an object of the present invention to provide a machine tool control system in which a metal mold to be used is already set in the turret when a machining program is drawn.

To attain the above object, the present invention provides a machine tool control system for transferring metal mold information indicating the characteristic properties of a metal mold used for machining based on a machining program for a machining schedule together with the machining program and the machining schedule to a controller for controlling a CNC device and the machine tool side, wherein the controller stores the machining schedule, machining program and metal mold information and transfers the machining program first which is required for machining to the CNC device and the metal mold information to the CNC device by a different route from that of the machining program, the CNC device transmits the machining program from the controller to the machine tool by each block, searches for a metal mold specified by the metal mold information from the used metal mold arrangement information about the tool storage on the machine tool side and transmits a metal mold exchange instruction for setting this searched metal mold in the turret of the machine tool.

According to a preferred embodiment of the present invention, the machine tool comprises a metal mold arrangement information transfer unit for detecting what metal molds are currently stored in the respective boxes of the tool storage and the respective metal mold mount stations of the turret at predetermined time intervals and storing the result of this detection in the CNC device as metal mold arrangement information.

According to another preferred embodiment of the present invention, the controller comprises a metal mold information pre-transfer unit for drawing a machining program for the next machining schedule after the transfer of a machining program and for transferring metal mold information to the CNC device by a different route from the transfer route of the machining program while the machine tool is carrying out machining based on the machining program when the metal mold information used in this machining program indicates manual exchange of a metal mold.

According to still another preferred embodiment of the present invention, the CNC device comprises a metal mold manual exchange instruction unit for causing a display unit to display a message for instructing manual exchange with a metal mold specified by metal mold information when the metal mold specified by the metal mold information from the controller is not present in the metal mold arrangement information.

The nature, principle and utility of the invention will become more apparent from the following detailed description when read in conjunction with the accompanying drawings.

DESCRIPTION OF THE PREFERRED EMBODIMENTS

Preferred embodiments of the present invention will be described in detail hereinunder with reference to the accompanying drawings.

Figure 2:
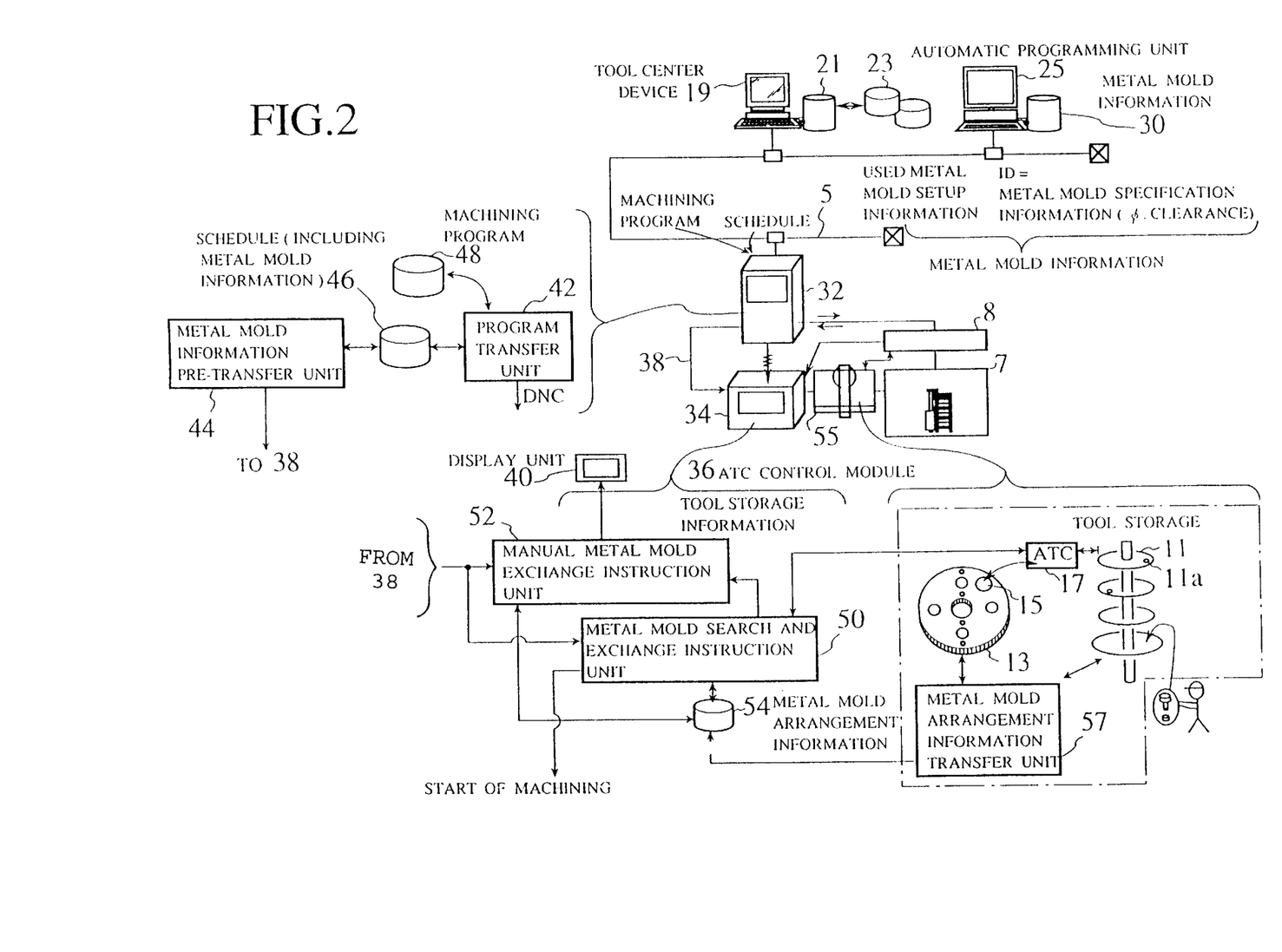
FIG. 2 is a schematic structural diagram of a machine tool control system according to an embodiment of the present invention.

FIG. 2 is a schematic structural diagram of a machine tool control system according to an embodiment of the present invention. The machine tool control system shown in FIG. 2 pre-stores used metal mold setup information $a_i$ for carrying out a schedule and metal mold specification information $c_i$ (such as the diameter of a hole "φ" when a circular hole is punched on the metal mold, the clearance and other information pertaining to the metal mold), indicating what is a metal mold $b_i$ specified by the metal mold setup information $a_i$, in a metal mold file 30 of the automatic programming unit 25, transfers the used metal mold setup information $a_i$ and the metal mold specification information $c_i$ (a combination of these will be referred to as "metal mold information $F_i$" hereinafter) together to the controller 32 when the tool center 19 transfers the schedule $H_i$ and the machining program $M_i$, and copies it in a file.

The controller 32 draws a predetermined schedule $h_i$ from the schedule $H_i$ and a machining program $m_i$ for the schedule $h_i$ from the machining program $M_i$ and transfers metal mold information $F_i$ used in this machining program $m_i$ to the CNC device 34.

The controller 32 pre-reads metal mold information $F_{i+1}$ for the next schedule $h_i$ and transmits it to an ATC control module 36 in the CNC device 34 by a different route (e.g., leased line 38).

The ATC control module 36 judges from the current metal mold arrangement information $Q_i$ whether the metal mold $b_i$ specified by the metal mold information $F_i$ or the metal mold information $F_{i+1}$ is present in the turret 13 or the tool storage 11 and displays a metal mold exchange message on the display unit 40 when it is not present.

Detailed Constitution of Each Unit

The controller 32 comprises a program transfer unit 42 and a metal mold information pre-transfer unit 44 as shown in FIG. 2.

The program transfer unit 42 draws a schedule $h_i$ from a schedule file 46 and a machining program $m_i$ for this schedule from a machining program file 48 and transfers them to the CNC device 34 by, for example, a DNC transfer system.

The metal mold information pre-transfer unit 44 transfers the metal mold information $F_i$ of the schedule drawn by the program transfer unit 42 to the ATC control module 36 of the CNC device 34 through a leased line 38. Thereafter, the unit 44 detects metal mold information $F_{i+1}$ for the next schedule $h_{i+1}$ in advance when the machining of the machining program mi is carried out and transfers it to the ATC control module 36 through the leased line 38.

The ATC control module 36, as shown in FIG. 2, comprises a metal mold search and exchange instruction unit 50 and a metal mold manual exchange instruction unit 52. The ATC control module 36, as described above, receives the metal mold information from leased line 38.

The metal mold search and exchange instruction unit 50 compares metal mold arrangement information Qi in the metal mold arrangement information file 54 with the metal mold information Fi or the metal mold information Fi+1 each time it is input and judges whether the metal mold bi specified by the metal mold information Fi or the metal mold information Fi+1 is present in the turret 13 or the tool storage 11.

When the metal mold bi having metal mold specifications ci specified by the metal mold information Fi or the metal mold information Fi+1 is not present in the turret 13 and the tool storage 11, the metal mold search and exchange instruction unit 50 informs the metal mold manual exchange instruction unit 52 that the desired metal mold is not present.

When the metal mold bi having the metal mold specifications ci specified by the metal mold information Fi or the metal mold information Fi+1 is present in the box 11a of the tool storage 11, the metal mold search and exchange instruction unit 50 sends to the ATC 17 an instruction for setting the metal mold in the box 11a in the turret 13.

When the metal mold manual exchange instruction unit 52 is informed that the desired metal mold is absent, it displays a message for exchanging the existing metal mold with a metal mold having specifications based on the metal mold information Fi or the metal mold information Fi+1 on the display unit 40.

There is provided a metal mold arrangement information transfer unit 57 on the side of the machine tool 55. The metal mold arrangement information transfer unit 57 detects what are the current metal molds stored in the respective boxes 11a of the tool storage 11 and set in the respective metal mold mount stations of the turret 13 at predetermined time intervals, creates metal mold arrangement information Qi indicating what metal mold is set where, and stores this information in the metal mold arrangement information file 54. The metal mold arrangement information transfer unit 57 may include a bar code reader or other types of sensors for detecting the current metal molds in the tool storage 11 and turret 13. These sensors may be actuated at predetermined time intervals to detect the current metal molds and to detect when molds have been replaced or removed. An exemplary embodiment of the metal mold arrangement information transfer unit 57 implemented with a bar code reader and bar code system is described below with reference to FIGS. 8 and 9.

The metal mold arrangement information Qi may include the specifications di (e.g., clearance, "φ", metal mold name, address, etc.) of metal molds currently set in the respective metal mold mount stations 15 of the turret 13 and the specifications ei (e.g., clearance, "φ", metal mold name, address, etc.) of metal molds stored in the respective boxes of the tool storage 11.

Figure 3:
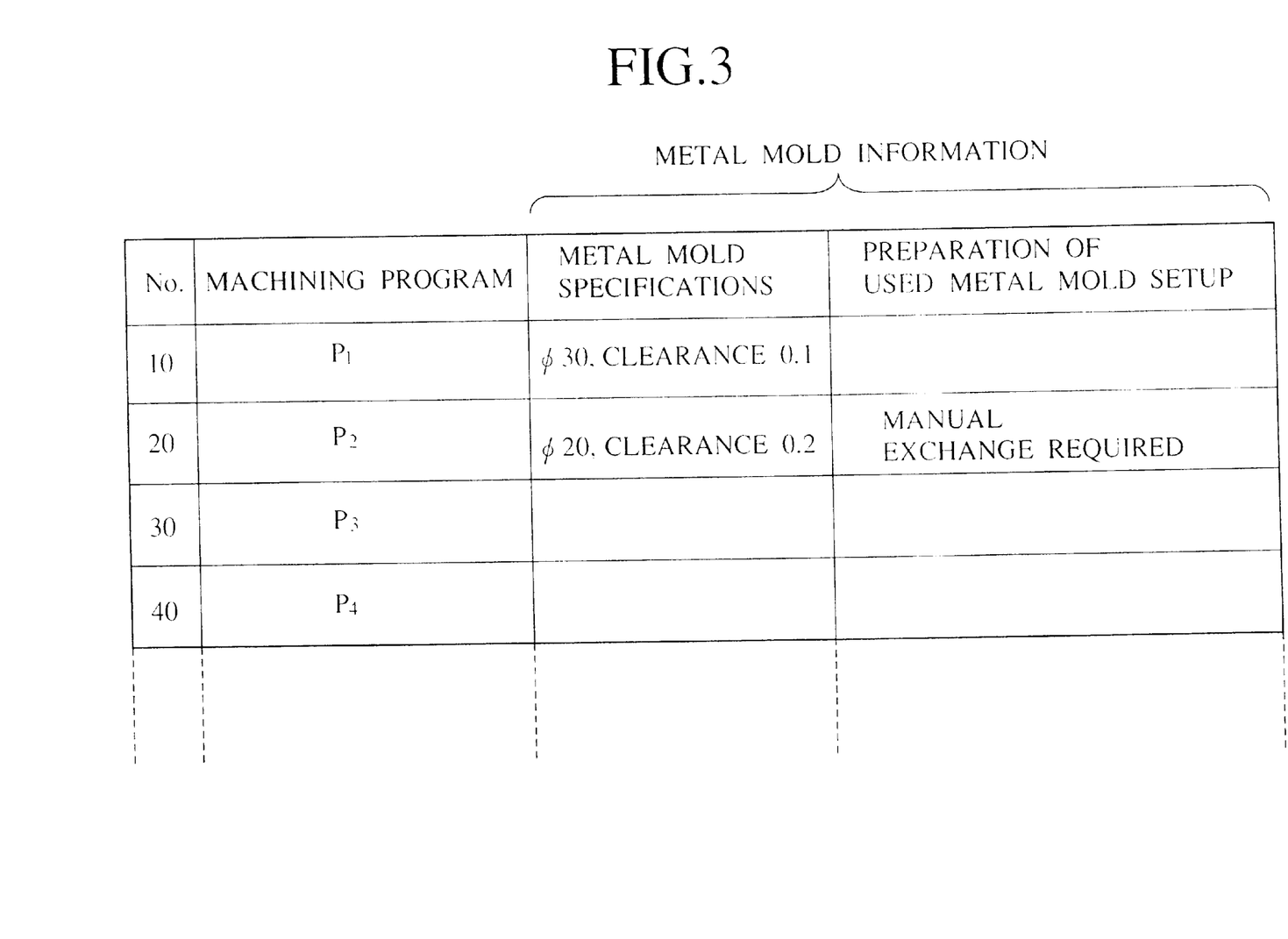
FIG. 3 is a diagram for explaining information stored in a schedule file.

Further, the schedule Hi in the schedule file 46 consists of, as shown in FIG. 3, metal mold specification information ci consisting of schedule No., the diameter "φ" of a circular hole punched on the metal mold, clearance and the like, and used metal mold setup information ai indicating whether manual exchange is necessary in such a manner that they are correlated with each other.

A description is subsequently given of the operation of the machine tool control system constituted above.

Figure 4:
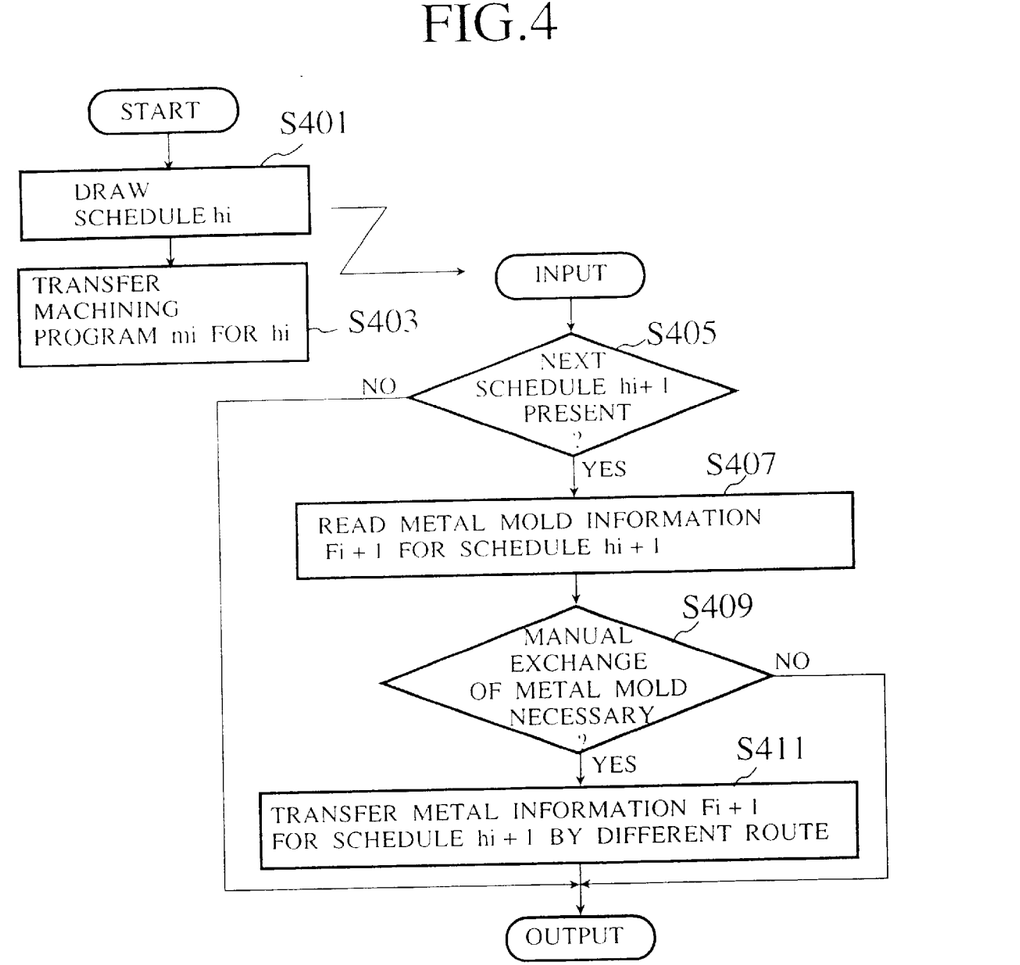
FIG. 4 is a flow chart for explaining the operation of a controller in the machine tool control system of the present invention.

FIG. 4 is a flow chart for explaining the operation of the controller in the machine tool control system of the present invention.

The controller 32 draws a first schedule hi for carrying out the schedule Hi from the schedule file 46 (step S401). The program transfer unit 42 transfers a machining program mi for the schedule hi to the CNC device 34 by, for example, a DNC transfer system (step S403).

The metal mold information pre-transfer unit 44 judges whether the next schedule hi+1 is present when the schedule hi is drawn in step S401 (step S405). When the metal mold information pre-transfer unit 44 judges that the next schedule hi+1 is present in step S405, it reads metal mold information Fi+1 for the next schedule hi+1 (step S407) and judges from this metal mold information Fi+1 whether manual exchange is required (step S409). For example, when schedule No. 20 is drawn in FIG. 3, manual exchange is required. When it is judged that manual exchange is required in step S409, the metal mold information Fi+1 for the next schedule hi+1 is transferred to the CNC device 34 by another route (e.g., by leased line 38) different from the transfer route of the machining program mi (step S411).

That is, the metal mold information pre-transfer unit 44 pre-transfers metal mold information by a different route while machining is carried out based on a machining program when a metal mold must be manually exchanged.

Figure 5:
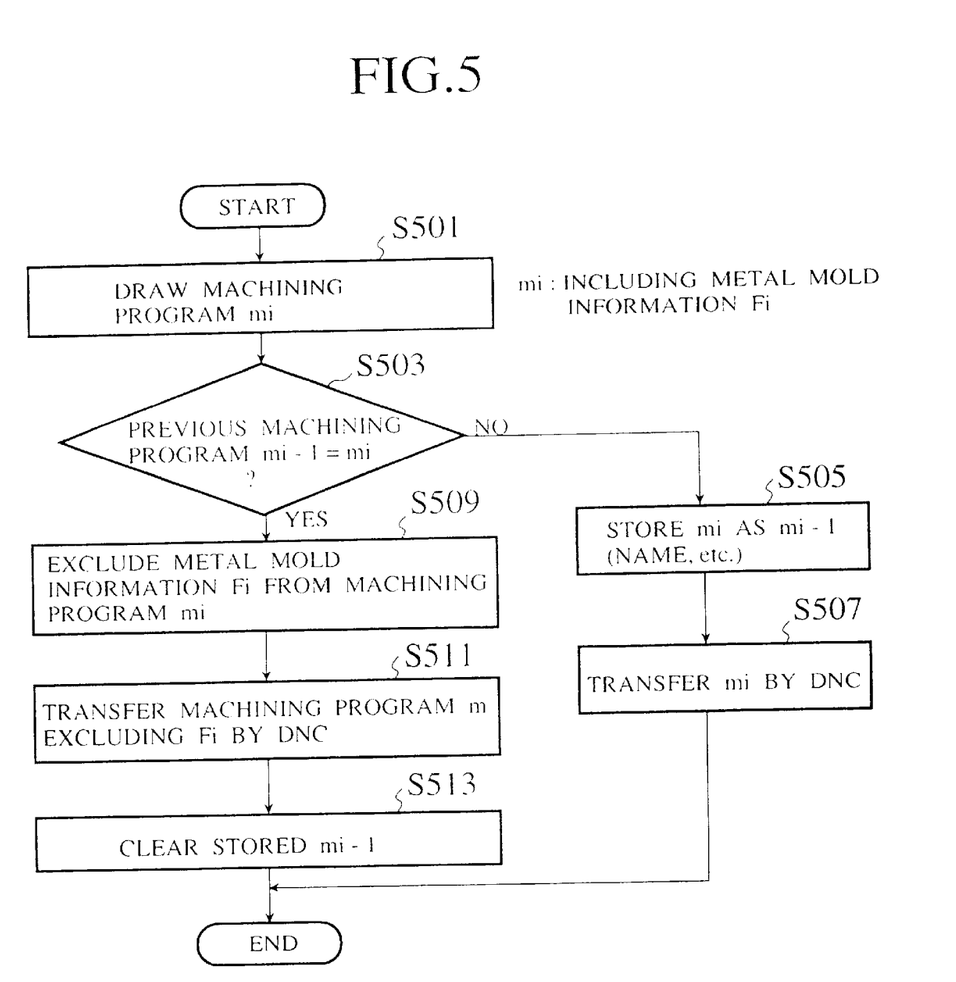
FIG. 5 is a flow chart for explaining program transfer processing in the machine tool control system of the present invention.

A description is subsequently given of program transfer. FIG. 5 is a flow chart for explaining program transfer processing in the machine tool control system of the present invention.

The program transfer unit 42 draws a machining program mi for a schedule hi when it draws the schedule hi (step S501). Then it judges whether the current machining program mi is the same as the previous machining program mi−1 which it has just transferred (step S503). When it judges that the program is not the same, it stores the current machining program mi as the previous machining program mi−1 (step S505) and then transfers the program to the CNC device 34 by, for example, a DNC transfer system (step S507).

When it judges that the current machining program mi is the same as the previous machining program mi−1 in step S503, it excludes metal mold information Fi from the machining program mi (step S509) and transfers the machining program m excluding the metal mold information Fi by DNC transfer system (step S511). Then it clears the stored machining program mi−1 (step S513).

That is, when the current machining program is the same as the previous machining program just transferred by the DNC transfer system, the program transfer unit 42 transfers the machining program excluding the metal mold information Fi. Therefore, the CNC device 34 does not need to separate the machining program and the metal mold information.

Figure 6:
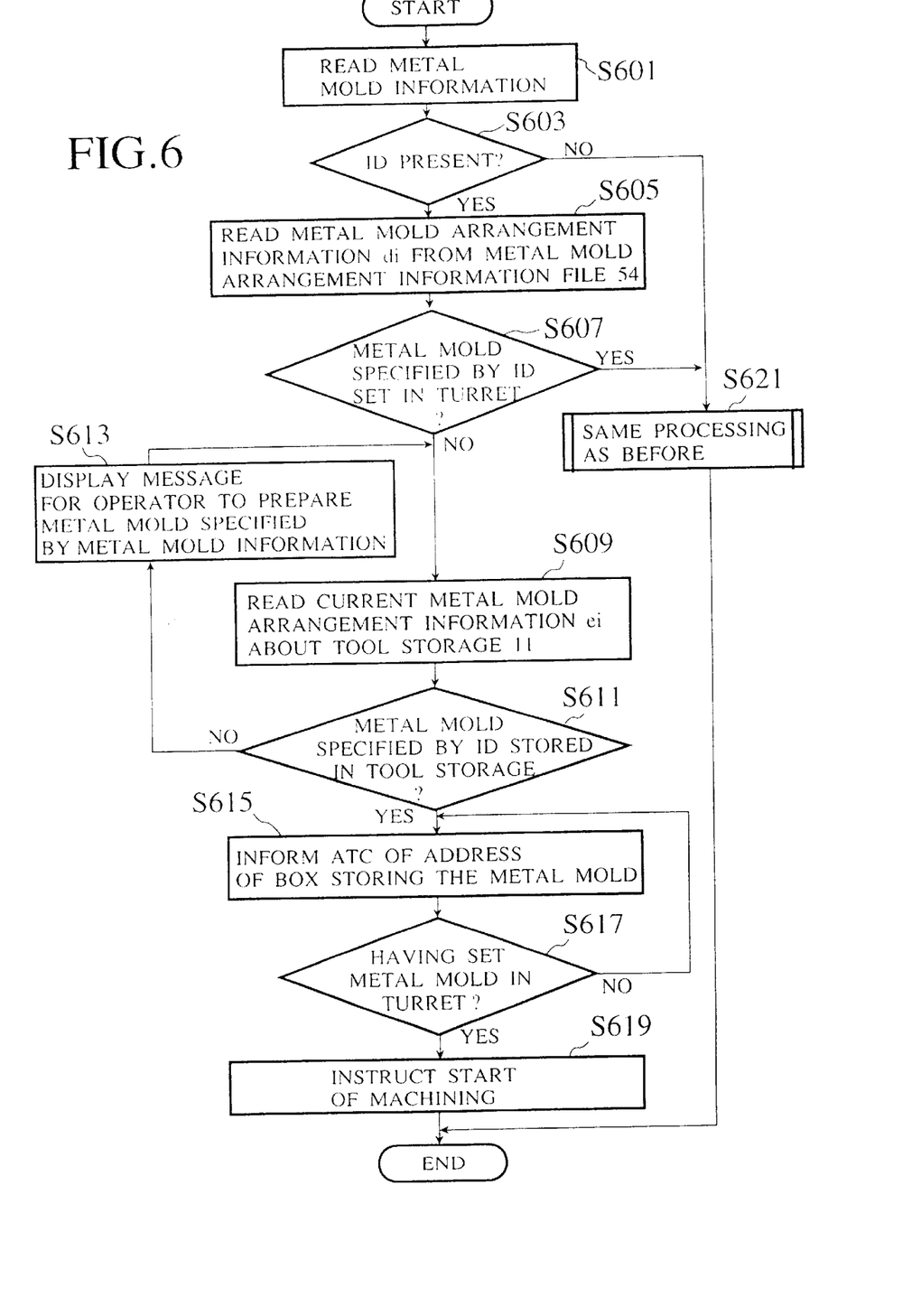
FIG. 6 is a flow chart showing the operation of an ATC control module in a CNC device.

A description is subsequently given of the operation of the ATC control module 36 of the CNC device 34 with reference to FIG. 6.

The metal mold search and exchange instruction unit 50 reads the metal mold information Fi or the metal mold information Fi+1 from the controller 34 (step S601) and judges whether the metal mold information Fi or the metal mold information Fi+1 includes metal mold specification information ci (to be simply referred to as "ID" hereinafter) (step S603).

When the metal mold search and exchange instruction unit 50 judges that ID is included in step S603, it reads the current metal mold arrangement information di about the turret 13 stored in the metal mold arrangement information file 54 (step S605) and judges whether a metal mold specified by the ID is set in the turret 13 (step S607). When the metal mold search and exchange instruction unit 50 judges that the metal mold specified by the ID is not set in the turret 13, it reads the current metal mold arrangement information ei about the tool storage 11 (step S609) and judges whether the metal mold specified by the ID is stored in the tool storage 11 (step S611).

When it is judged that the metal mold specified by the ID is not present in the tool storage 11 in step S611, the metal mold manual exchange instruction unit 52 causes the display unit 40 to display a message for storing a metal mold specified by the metal mold information Fi or the metal mold information Fi+1 in the tool storage 11 (step S613). Then the processing returns to step S609.

When it is judged that the metal mold specified by the ID is currently present in the tool storage 11 in step S611, the metal mold manual exchange instruction unit 52 informs the ATC 17 of the address of a box storing the metal mold (step S615).

When the ATC 17 is informed of the address of the box storing the metal mold, it sets the metal mold of the box in the turret 13 and informs the metal mold search and exchange instruction unit 50 of the completion of setting.

The metal mold search and exchange instruction unit 50 judges whether the metal mold has been set in the turret 13 (step S617) and when it judges that the metal mold has been set, it sends an instruction for starting machining to the turret punch press 55 (step S619).

Meanwhile, when it is judged that the ID is not included in the metal mold information Fi or the metal mold information Fi+1 in step S603 or when it is judged that the metal mold specified by the ID is present in the turret 13 in step S607, the same processing as, for example, that of the prior art is carried out (step S621).

That is, the ATC control module 36 takes out a metal mold of a type and a clearance specified by the controller from the turret 13 or the tool storage 11 and sets it in a predetermined metal mold mount station of the turret.

Figure 7:
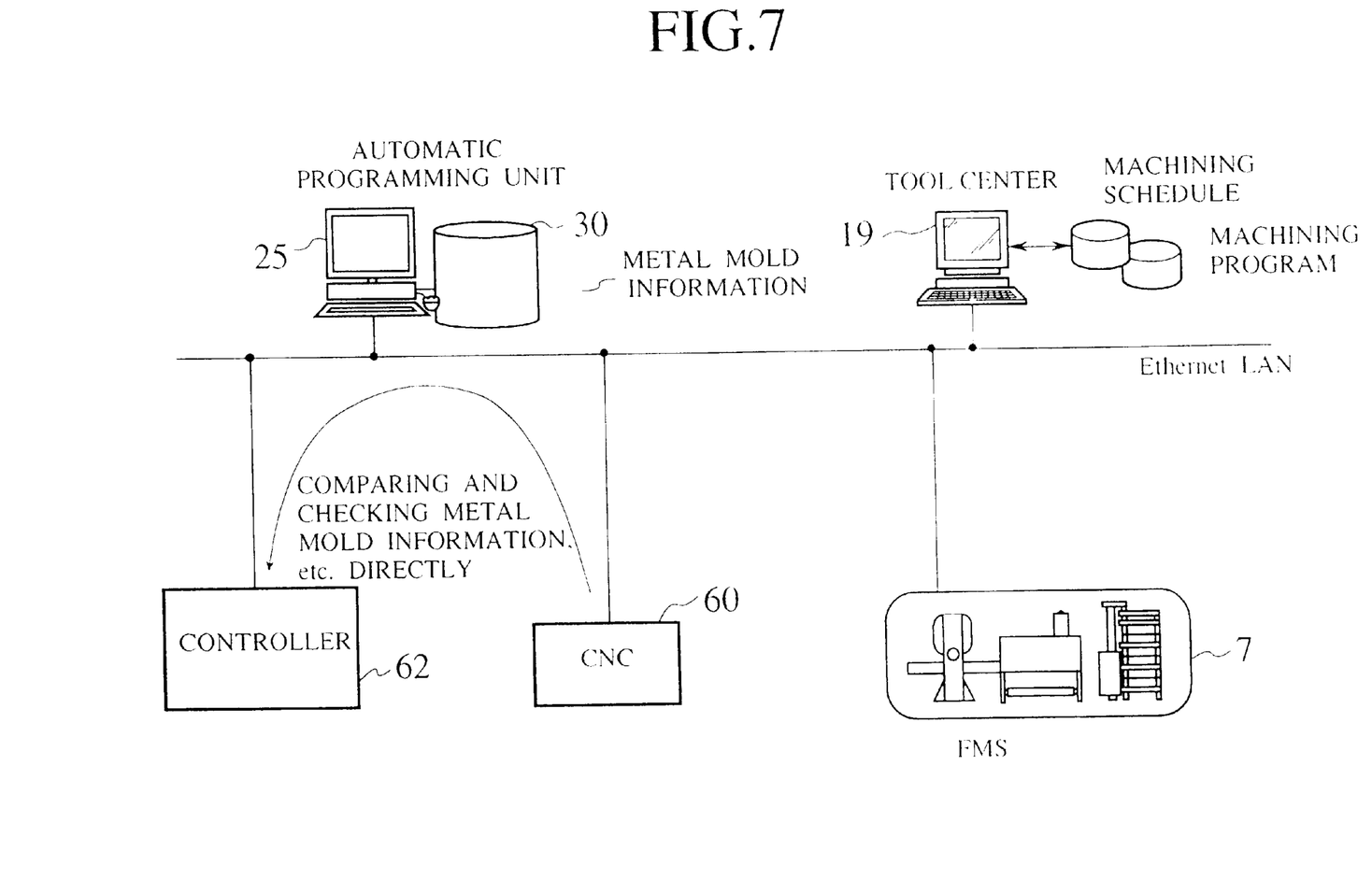
FIG. 7 is a schematic structural diagram of a machine tool control system according to another embodiment of the present invention.

While there has been described an embodiment of the present invention in which metal mold information, a machining program and the like are transferred from a host computer to a subordinate computer, as shown in FIG. 7, the automatic programming unit 25, the tool center 19, a CNC device 60, a controller 62 and the like may be connected by Ethernet LAN 5, so that metal mold arrangement information Fi may be stored in the controller 62 and directly read from the CNC device 60, and a metal mold specified by the ID may be set in the turret 13. In this case, the machining program and the metal mold information are not separated from each other by the CNC device 60.

Figure 8:
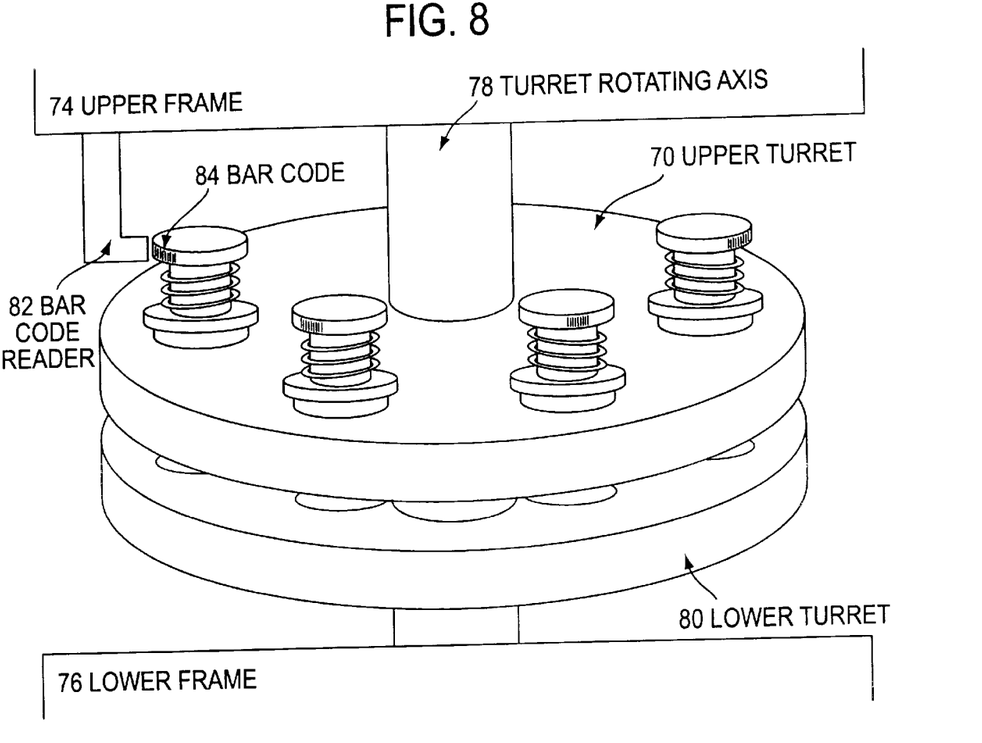
FIGS. 8 and 9 illustrate an exemplary bar code reader and bar code system that may be used to implement a metal mold arrangement information transfer unit for detecting current metal molds, in accordance with another aspect of the present invention.
Figure 9:
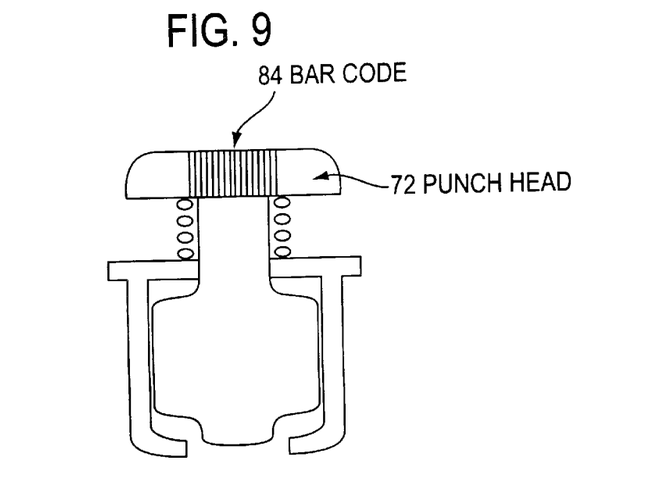

In accordance with an aspect of the present invention, the metal mold arrangement information transfer unit 57 may include a bar code reader and/or other types of sensors for detecting the current metal molds in the tool storage 11 and turret 13. FIGS. 8 and 9 illustrate an exemplary embodiment of a bar code reader and bar code system that may be utilized to implement the metal mold arrangement information transfer unit 57 of the present invention. As shown in the figures, a bar code 84 may be provided on each of the metal molds in order to detect the various types of metal molds that are present. The bar code 84 may include information indicating the dimensions and other specifications of the metal mold. The bar code 84 may be located or attached to the metal mold at a predetermined location so that it may be easily scanned or read by a bar code reader 82. For example, as shown in FIGS. 8 and 9, the bar code 84 may be attached to the punch head 72.

One or more bar code readers 82 may be provided for sensing and reading the bar codes 84 of the current metal molds in the tool storage 11 and turret 13. The bar code reader 82 may also be movable relative to the metal molds to read the bar codes 84, or the bar code reader 82 may sequentially read each bar code 84 of the current metal molds while the turret 13 or each tool box 11a is rotated. The metal mold arrangement information transfer unit 57 may detect and store the location of each of the current metal molds as the bar codes 84 are read by the bar code reader 82. FIG. 8 illustrates an exemplary arrangement of the bar code reader 82 for reading the current metal molds set in the turret 13. A similar arrangement may also be provided for detecting the current metal molds in the tool boxes 11a.

As shown in FIG. 8, the bar code reader 82 may be supported by the upper frame 74 of the turret 13 in order to sequentially read the bar codes 84 attached to the punch heads of the current metal molds set in the upper turret 70. Alternatively, the bar code reader 82 may be supported by the lower framer 76 of the turret 13 in order to read the bar codes 84 attached to the punch heads or provided at another location of the current metal molds. As the upper turret 70 and/or lower turret 80 are rotated about the turret rotating axis 78, the bar code reader 84 may sequentially scan and read each of the bar codes 84 attached to the metal molds. As noted above, the scanning operation performed by the bar code reader 84 may be actuated at predetermined time intervals to detect the current metal molds and to detect when molds have been replaced or removed. After the current metal molds have been detected from the bar codes 84 read by the bar code reader 82, the metal mold arrangement information transfer unit 57 creates metal mold arrangement information Qi indicating what metal mold is set where, and stores this information in the metal mold arrangement information file 54.

As described above, according to the embodiment of the present invention, a machining schedule, a machining program and metal mold information indicating the characteristic properties of a metal mold are transferred together to the controller for controlling the CNC device and the machine tool side, the controller transmits the metal mold information for the machining program to the CNC device by a different route from that of the machining program, and the CNC device searches for a metal mold specified by the metal mold information from the metal mold arrangement information about the tool storage of the machine tool and sets it in the turret of the machine tool.

Therefore, even if a metal mold different from a metal mold controlled by the automatic programming unit is stored in a box of the tool storage, a metal mold specified by metal mold information is searched for from another box and set in the turret of the machine tool in advance. Therefore, an effect that the stoppage of the machine tool does not occur frequently is obtained. Since the metal mold information is transferred to the CNC device by another route different from that of the machining program, the processing of separating the metal mold information from the machining program is eliminated. Therefore, there is obtained an effect that the time required to start machining is reduced.

Since the metal mold arrangement information transfer unit in the machine tool detects what metal molds are currently stored in the respective boxes of the tool storage and the mount stations of the turret at predetermined time intervals, and stores the result of this detection in the CNC device as metal mold arrangement information, there is obtained an effect that the CNC device always knows what metal molds are currently stored in the respective boxes of the tool storage and set in the turret.

Further, since the controller transfers metal mold information to the CNC device by a different route from that of the machining program, while the machine tool is carrying out machining based on the machining program when the metal mold information used in the machining program indicates manual exchange of a metal mold, the processing of separating the metal mold information from the machining program is eliminated. Therefore, there are obtained such effects that the time required to start machining is reduced and a setup plan for manual exchange can be made by the next machining Moreover, since the CNC device causes the display unit to display a message for instructing manual exchange with a metal mold specified by metal mold information when the metal mold specified by the metal mold information from the controller is not present in metal mold arrangement information, there is obtained an effect that an operator can be alerted to prepare a desired metal mold for the next machining.

It should be understood that many modifications and adaptations of the present invention will become apparent to those skilled in the art and the invention is intended to encompass such obvious modifications and changes in the scope of the claims appended hereto.

What is claimed:

1. A machine tool control system for controlling a machine tool unit that carries out machining based on a machining program of a machining schedule, said machine tool unit including a CNC device, a turret for supporting a plurality of metal molds and a tool storage unit for storing a plurality of metal molds, said machine tool control system comprising:

a metal mold arrangement information file that stores metal mold arrangement information indicating each metal mold located in the tool storage unit of the machine tool unit; and a controller that stores the machining schedule and metal mold information indicating characteristic properties of a metal mold to be used by the machine tool unit for machining based on each machining program associated with the machining schedule, said controller comprising:

a program transfer unit for transferring a machining program to the CNC device of the machine tool unit; and a dedicated line for transferring the metal mold information to the CNC device by a different route than that for each respective machining program, wherein said CNC device searches the metal mold arrangement information stored in the metal mold arrangement information file to determine if each metal mold specified by the metal mold information is located in the machine tool unit, said CNC device transmitting metal mold exchange instruction information when a specified metal mold is determined not to be present, to facilitate setting a specified metal mold in the turret of the machine tool unit to carry out machining according to the associated machining program.

2. A machine tool control system according to claim 1, wherein said machine tool unit comprises a metal mold arrangement information transfer unit that detects each metal mold that is located in respective boxes of the tool storage unit and located in respective metal mold mount stations of the turret, and transfers the metal mold arrangement information indicating the location of each metal mold to the metal mold arrangement information file for storage in the metal mold arrangement information file.

3. A machine tool control system according to claim 1, wherein said controller further comprises a metal mold information pre-transfer unit that pre-reads a machining program for the next machining schedule after a current machining program has been transferred by the program transfer unit and determines whether manual exchange of a metal mold for metal mold setup is required for the next machining schedule, said metal mold information pre-transfer unit transferring metal mold information for the next machining schedule to the CNC device by said dedicated line when it is determined that manual exchange of a metal mold is required.

4. A machine tool control system according to claim 1, wherein said CNC device comprises a metal mold manual exchange instruction unit that causes a display unit to display a message to an operator for instructing manual exchange with a metal mold specified by the metal mold information when the specified metal mold is determined not to be present based on the metal mold arrangement information.

5. A machine tool control system according to claim 1, wherein said machine tool unit comprises a turret punch press.

6. A machine tool control system according to claim 1, wherein said CNC device comprises an automatic metal mold exchanging unit that takes a specified metal mold from the tool storage unit and sets the specified metal mold in the turret of the machine tool unit.

7. A machine tool control method for controlling a machine tool unit that carries out machining based on a machining program of a machining schedule, said machine tool unit including a CNC device, a turret for supporting a plurality of metal molds and a tool storage unit for storing a plurality of metal molds, said method comprising:

storing, in a metal mold arrangement information file, metal mold arrangement information indicating each metal mold located in the machine tool unit;

storing, in a controller, the machining schedule and metal mold information indicating characteristic properties of a metal mold to be used by the machine tool unit for machining based on each machining program associated with the machining schedule;

transferring a machining program from the controller to the CNC device of the machine tool unit and, thereafter, transferring the metal mold information from the controller to the CNC device by a different route than that for each respective machining program;

transferring each machining program from said CNC device to the machine tool unit;

searching the metal mold arrangement information stored in the metal mold arrangement information file to determine if each metal mold specified by the metal mold information is located in the machine tool unit; and transmitting metal mold exchange instruction information when a specified metal mold is determined not to be present, so that the specified metal mold may be set in the machine tool unit to carry out machining according to the associated machining program.

8. A machine tool control method according to claim 7, wherein said method further comprises:

detecting each metal mold that is located in respective boxes of the tool storage unit and located in respective metal mold mount stations of the turret;

transferring, based on said detecting, the metal mold arrangement information indicating the location of each metal mold to the metal mold arrangement information file; and thereafter, storing the metal mold arrangement information in the metal mold arrangement information file.

9. A machine tool control method according to claim 7, wherein said method further comprises:

pre-reading a machining program for the next machining schedule after a current machining program has been transferred to the machine tool unit;

determining whether manual exchange of a metal mold for metal mold setup is required for the next machining schedule; and based on said determining, transferring metal mold information for the next machining schedule to the CNC device when it is determined that manual exchange of a metal mold is required.

10. A machine tool control method according to claim 7, wherein said method further comprises, displaying on a display unit, a message for instructing manual exchange with a metal mold specified by the metal mold information when the specified metal mold is determined not to be present based on the metal mold arrangement information.

11. A machine tool control method according to claim 7, wherein said machine tool unit comprises a turret punch press.

12. A machine tool control method according to claim 7, wherein said method further comprises taking a specified metal mold from the tool storage unit and setting the specified metal mold in the turret of the machine tool unit.

* * * * *